United States Patent
Nakashima et al.

(10) Patent No.: US 11,634,026 B2
(45) Date of Patent: Apr. 25, 2023

(54) TRANSPORT VEHICLE

(71) Applicants: TOYOTA JIDOSHA KABUSHIKI KAISHA, Toyota (JP); HINO MOTORS, LTD., Hino (JP)

(72) Inventors: Tomoki Nakashima, Nagoya (JP); Toshiyuki Kondo, Chiryu (JP); Yukihide Yokoyama, Toyota (JP)

(73) Assignees: Toyota Jidosha Kabushiki Kaisha, Toyota (JP); Hino Motors, Ltd., Hino (JP)

( * ) Notice: Subject to any disclaimer, the term of this patent is extended or adjusted under 35 U.S.C. 154(b) by 0 days.

(21) Appl. No.: 17/228,097

(22) Filed: Apr. 12, 2021

(65) Prior Publication Data

US 2021/0402873 A1 Dec. 30, 2021

(30) Foreign Application Priority Data

Jun. 24, 2020 (JP) .............................. JP2020-108502

(51) Int. Cl.
*B60K 15/07* (2006.01)
*B60K 15/03* (2006.01)
*B60L 50/71* (2019.01)

(52) U.S. Cl.
CPC ........ *B60K 15/07* (2013.01); *B60K 15/03006* (2013.01); *B60K 2015/03118* (2013.01); *B60L 50/71* (2019.02)

(58) Field of Classification Search
CPC .............. B60K 15/07; B60K 15/03006; B60K 2015/03118; B60L 50/71
See application file for complete search history.

(56) References Cited

U.S. PATENT DOCUMENTS

| 6,676,163 | B2 * | 1/2004 | Joitescu | B60K 15/07 |
| | | | | 280/834 |
| 9,878,611 | B1 * | 1/2018 | Abd Elhamid | B60K 15/03006 |
| 10,538,159 | B2 * | 1/2020 | Kataoka | B60K 15/063 |
| 10,717,356 | B2 * | 7/2020 | Kataoka | B60K 15/07 |
| 10,836,441 | B2 * | 11/2020 | Sawai | B60K 15/07 |
| 10,850,611 | B2 * | 12/2020 | Buchholz | B60K 15/03006 |
| 10,926,628 | B2 * | 2/2021 | Otsura | B60K 15/03006 |
| 2004/0108150 | A1 | 6/2004 | Guidry et al. | |
| 2016/0023548 | A1 * | 1/2016 | Crist | B60K 15/03006 |
| | | | | 180/271 |
| 2019/0047404 | A1 | 2/2019 | Sawai | |
| 2019/0085791 | A1 * | 3/2019 | Rike | F02M 21/0212 |

(Continued)

FOREIGN PATENT DOCUMENTS

| DE | 202012103321 U1 * | 11/2012 | ............ B60K 15/07 |
| DE | 102018010112 A1 * | 6/2019 | |
| DE | 102018001298 A1 * | 8/2019 | |

(Continued)

*Primary Examiner* — Jacob B Meyer
(74) *Attorney, Agent, or Firm* — Finnegan, Henderson, Farabow, Garrett & Dunner, LLP

(57) ABSTRACT

A transport vehicle configured to run on electricity generated by a fuel cell includes: a body having a cargo space for freight; a chassis frame located below the body and supporting the body; and a tank unit including a plurality of tanks that stores fuel gas to be used for power generation by the fuel cell and a connecting portion connecting the tanks, the tank unit being located between the cargo space and the chassis frame.

7 Claims, 6 Drawing Sheets

(56) References Cited

U.S. PATENT DOCUMENTS

2021/0402873 A1* 12/2021 Nakashima ...... B60K 15/03006
2022/0135158 A1*  5/2022 Lee ........................ B60L 50/71
                                                            180/58

FOREIGN PATENT DOCUMENTS

| DE | 102018117356 A1 * | 1/2020 | ............... B60K 1/00 |
| DE | 102018212900 A1 * | 2/2020 | |
| DE | 202020105264 U1 * | 11/2020 | |
| DE | 102019211263 A1 * | 2/2021 | |
| DE | 102021106038 A1 * | 5/2021 | |
| JP | 09-95146 A | 4/1997 | |
| JP | 2004-187485 A | 7/2004 | |
| JP | 2007-099032 A | 4/2007 | |
| JP | 2017-128202 A | 7/2017 | |
| JP | 2019-035442 A | 3/2019 | |
| JP | 2019-158132 A | 9/2019 | |
| WO | WO-03019309 A1 * | 3/2003 | ............. B60G 13/14 |
| WO | WO-2015017844 A1 * | 2/2015 | ........... B60K 15/013 |
| WO | WO-2020197856 A1 * | 10/2020 | ............. B60K 15/03 |

* cited by examiner

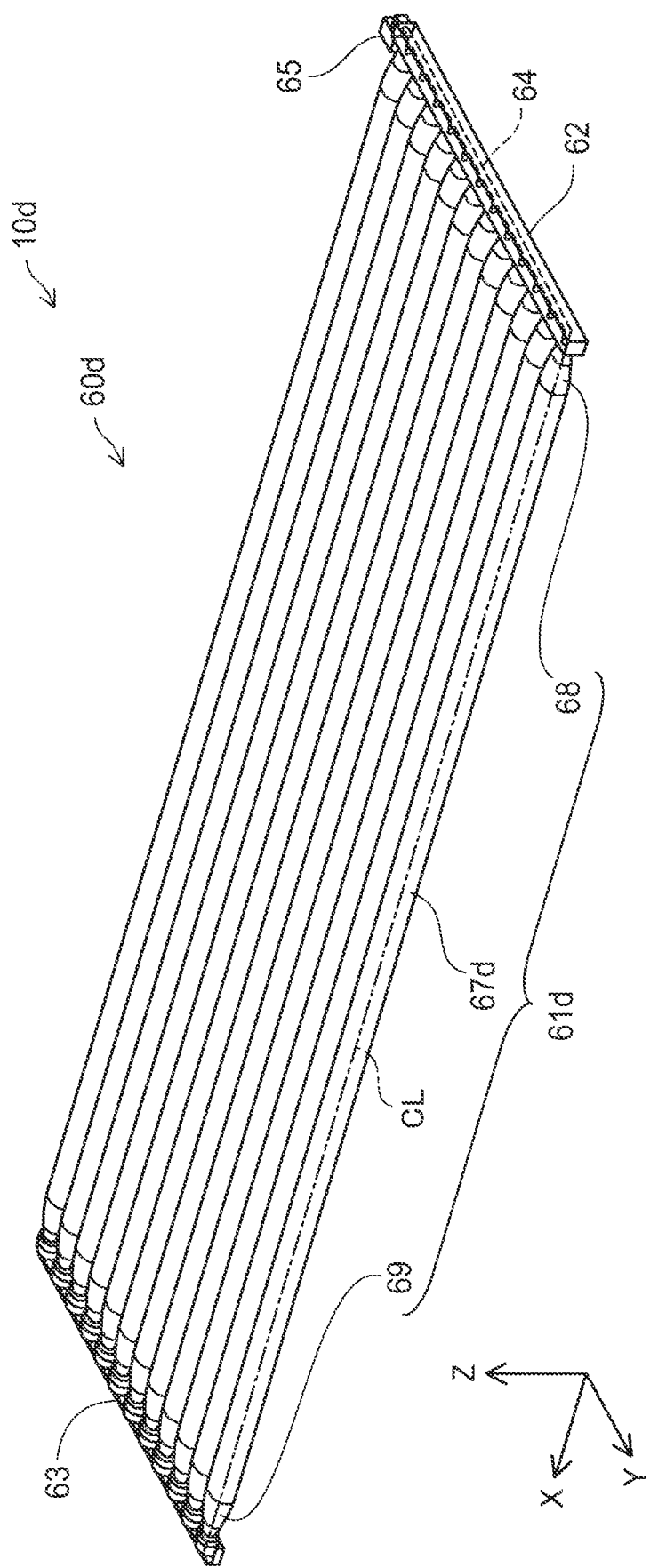

TRANSPORT VEHICLE

CROSS-REFERENCE TO RELATED APPLICATION

This application claims priority to Japanese Patent Application No. 2020-108502 filed on Jun. 24, 2020, incorporated herein by reference in its entirety.

BACKGROUND

1. Technical Field

The disclosure relates to transport vehicles.

2. Description of Related Art

Japanese Unexamined Patent Application Publication No. 2017-128202 (JP 2017-128202 A) discloses a working vehicle in which a plurality of hydrogen tanks storing hydrogen gas to be supplied to a fuel cell is stacked on top of each other behind a cab.

SUMMARY

Transport vehicles such as trucks are typically desired to have a large space for freight so that they can carry a large amount of freight at a time and to have a long driving range. In transport vehicles that are powered by a fuel cell, it is preferable to mount a large number of fuel gas tanks in order to ensure a sufficient driving range. However, in the case where fuel gas tanks are stacked on top of each other behind the cab as in JP 2017-128202 A, the floor area of the space for freight is reduced. Such a reduced floor area of the space for freight may make loading of long freight and efficient unloading of freight difficult.

(1) The present disclosure provides a transport vehicle configured to run on electricity generated by a fuel cell. The transport vehicle includes: a body having a cargo space for freight; a chassis frame located below the body and supporting the body; and a tank unit including a plurality of tanks that stores fuel gas to be used for power generation by the fuel cell and a connecting portion connecting the tanks, the tank unit being located between the cargo space and the chassis frame.

According to the transport vehicle of this form, the tank unit is located between the cargo space and the chassis frame. With this configuration, the fuel gas capacity is increased without reducing the floor area of the cargo space, and the driving range is increased.

(2) In the transport vehicle of the above form, the tank unit may be located between a bottom surface of the body and an upper surface of the chassis frame.

According to the transport vehicle of this form, in the form in which the tank unit is located outside the body, the fuel gas capacity is increased without reducing the floor area of the cargo space, and the driving range is increased.

(3) In the transport vehicle of the above form, the body may have a tank storage space below the cargo space, and the tank unit may be located in the tank storage space.

According to the transport vehicle of this form, in the form in which the tank unit is located inside the body, the fuel gas capacity is increased without reducing the floor area of the cargo space, and the driving range is increased.

(4) In the transport vehicle of the above foim, each of the tanks may have a cylindrical portion, and the cylindrical portion of each of the tanks may have a same outer diameter.

According to the transport vehicle of this form, manufacturing cost of the tank unit is reduced as compared to a form in which the cylindrical portions of the tanks have different outer diameters.

(5) In the transport vehicle of the above form, each of the tanks may have a cylindrical portion, and the cylindrical portion of each of the tanks may be arranged parallel to each other.

According to the transport vehicle of this form, the tanks can be arranged more densely as compared to a form in which the cylindrical portions of the tanks are arranged with random orientations. Accordingly, the fuel gas capacity is more effectively increased.

(6) The transport vehicle of the above form may further include a cooling device configured to cool the cargo space.

According to the transport vehicle of this form, as hydrogen gas stored in the tanks is consumed, the internal pressure of each tank decreases and the temperature of each tank decreases, drawing heat away from the surrounding environment. This configuration thus reduces heat transfer from the floor of the cargo space to the inside of the cargo space. Power consumption of the cooling device is thus reduced.

(7) The transport vehicle of the above form may further include a slide mechanism configured to move the tank unit between a first position and a second position. The first position may be a position where the tank unit is located when the fuel gas is supplied from the tank unit to the fuel cell. The second position may be a position where the tank unit is located when the tank unit is attached to the transport vehicle or when the tank unit is removed from the transport vehicle.

According to the transport vehicle of this form, the slide mechanism can move the tank unit between the first position and the second position. This configuration facilitates replacement of the tank unit. The present disclosure can also be implemented in various forms other than the transport vehicle. For example, the present disclosure can be implemented in forms such as a fuel cell vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a perspective view illustrating the configuration of a tank unit of a fourth embodiment.

DETAILED DESCRIPTION OF EMBODIMENTS

A. First Embodiment

Figure 1:
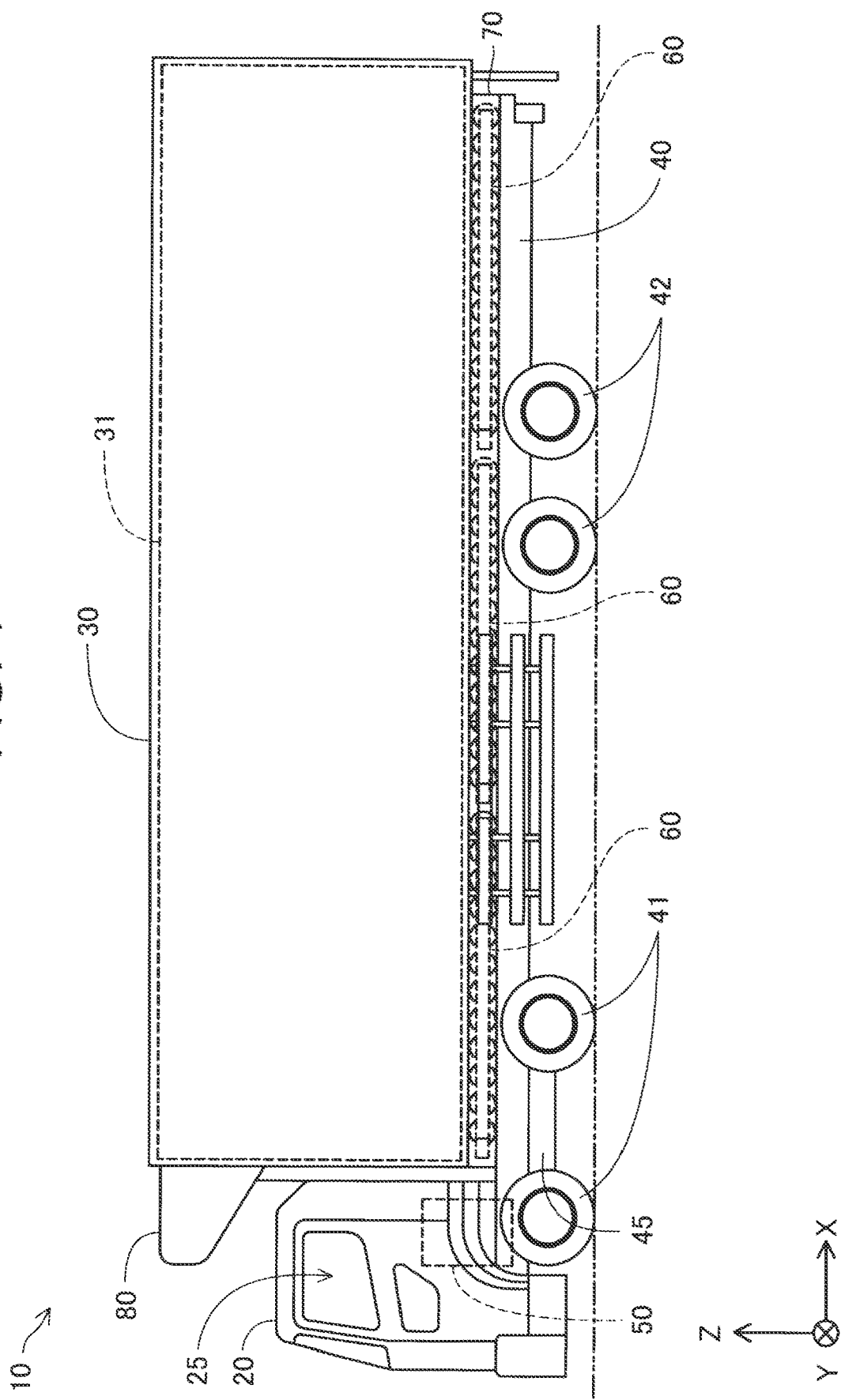
FIG. 1 is a side view illustrating a schematic configuration of a transport vehicle of a first embodiment.

FIG. 1 is a side view illustrating a schematic configuration of a transport vehicle 10 of a first embodiment. Arrows indicating X, Y, and Z directions that are perpendicular to each other are shown in FIG. 1. The X direction is the longitudinal direction of the transport vehicle 10, the Y direction is the lateral direction of the transport vehicle 10, and the Z direction is the vertical direction of the transport vehicle 10. The arrows indicating the X, Y, and Z directions are shown as necessary in other figures so that the directions correspond to those in FIG. 1.

The transport vehicle 10 is equipped with a fuel cell 50 and runs on electricity generated by the fuel cell 50. In the present embodiment, the transport vehicle 10 is configured as a freezer truck that carries frozen freight, and includes a cab 20, a body 30, a chassis frame 40, and a cooling device 80. The transport vehicle 10 may be configured as a refrigerated truck that carries refrigerated freight.

A driver's seat 25 for a driver etc. is located in the cab 20. The transport vehicle 10 may be configured to travel by remote control by an operator etc. or may be configured to travel autonomously without operations by a driver, an operator, etc.

The body 30 is located behind the cab 20. The body 30 has a cargo space 31 for freight. In the present embodiment, the body 30 is configured as a box-shaped van body with a ceiling. More specifically, the body 30 is configured as a refrigerated container with a heat insulation material on its ceiling, side walls, and floor that define the cargo space 31.

The cooling device 80 protrudes above the cab 20 from the front surface of the body 30. The cooling device 80 is composed of a compressor that compresses and liquefies a gas refrigerant, a condenser that cools the high temperature, high pressure refrigerant compressed by the compressor using outside air, and an evaporator that evaporates the refrigerant cooled by the condenser to cause the refrigerant to absorb heat in the cargo space 31. The cooling device 80 thus cools the cargo space 31. The cooling device 80 is fixed to the front surface of the body 30 by bolts etc.

The chassis frame 40 is located below the driver's seat 25 and the body 30. The chassis frame 40 is composed of a pair of side members extending in the longitudinal direction X and a plurality of cross members extending between the side members in the lateral direction Y. The side members and the cross members are fixed to each other by welding, bolts, etc. The cab 20, the body 30, and the fuel cell 50 are fixed to the chassis frame 40 by bolts etc., and the chassis frame 40 supports the cab 20, the body 30, and the fuel cell 50. Drive wheels 41 and driven wheels 42 are connected to the chassis frame 40 via a suspension.

The fuel cell 50 is located below the driver's seat 25. The fuel cell 50 generates electricity by an electrochemical reaction between fuel gas and oxidizing gas. In the present embodiment, the fuel cell 50 is a polymer electrolyte fuel cell and generates electricity using hydrogen gas and air that are supplied as fuel gas and oxidizing gas, respectively. The hydrogen gas is supplied from a tank unit 60 that will be described later to the fuel cell 50. The air is supplied from, e.g., a compressor mounted on the transport vehicle 10 to the fuel cell 50. An electronic control unit (ECU) mounted on the transport vehicle 10 controls the supply of hydrogen gas and air to the fuel cell 50. The fuel cell 50 may be a solid oxide fuel cell instead of the polymer electrolyte fuel cell.

The tank unit 60 is located between the cargo space 31 of the body 30 and the chassis frame 40. In the present embodiment, three tank units 60 are arranged in the longitudinal direction X. The tank units 60 have the same configuration. The tank units 60 are configured to store hydrogen gas at a pressure as high as, e.g., 35 MPa or 70 MPa. Each tank unit 60 and the fuel cell 50 are connected by a hydrogen supply pipe. The hydrogen supply pipe is provided with a pressure reducing valve for decompressing the hydrogen gas supplied from each tank unit 60 to a predetermined pressure and an injector for injecting the decompressed hydrogen gas toward the fuel cell 50. The number of tank units 60 arranged between the cargo space 31 of the body 30 and the chassis frame 40 is not limited to three, and may be one or two or may be four or more. The configuration of the tank units 60 will be specifically described later.

In the present embodiment, a tank case 70 is located between the bottom surface of the body 30 and the upper surface of the chassis frame 40, and the tank units 60 are housed in the tank case 70. The tank case 70 has a box shape with a heat insulation material on its ceiling, side walls, and floor. The upper surface of the tank case 70 is in contact with the bottom surface of the body 30. The tank units 60 are fixed to the tank case 70 by bolts etc. The tank case 70 is fixed to the chassis frame 40 by bolts etc. The tank units 60 may be directly fixed to the chassis frame 40 instead of being housed in the tank case 70.

A traction motor 45 is fixed to the chassis frame 40. The traction motor 45 is driven by electricity generated by the fuel cell 50 to rotate the drive wheels 41. The transport vehicle 10 travels as the drive wheels 41 rotate. The electricity generated by the fuel cell 50 is supplied from the fuel cell 50 to the traction motor 45 via a DC-to-DC converter, an inverter, etc. A secondary battery or a capacitor is mounted on the transport vehicle 10, and the electricity generated by the fuel cell 50 may be supplied to the traction motor 45 after being stored in the secondary battery or the capacitor. The traction motor 45 may be mounted in the drive wheels 41 as an in-wheel motor instead of being fixed to the chassis frame 40.

Figure 2:
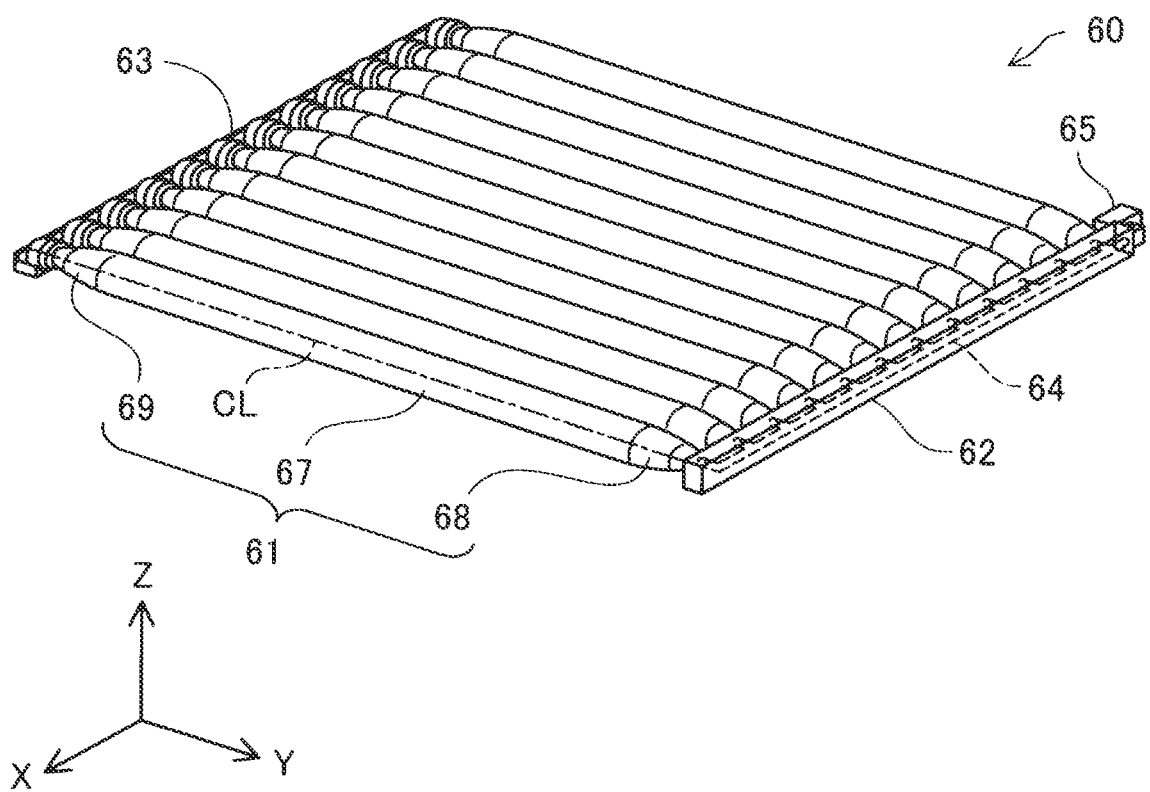
FIG. 2 is a perspective view illustrating the configuration of a tank unit of the first embodiment.

FIG. 2 is a perspective view illustrating the configuration of the tank unit 60 in the present embodiment. In the present embodiment, the tank unit 60 includes a plurality of tanks 61, a first connecting portion 62, a second connecting portion 63, and a main stop valve 65. In the present embodiment, the tank unit 60 includes 12 tanks 61, and the 12 tanks 61 are arranged in the longitudinal direction X. Each tank 61 includes a cylindrical portion 67, a first end 68, and a second end 69. The cylindrical portion 67 has a cylindrical shape about the axis CL of the tank 61. The first end 68 is connected to one end of the cylindrical portion 67 and has a generally hemispherical or conical shape about the axis CL. The second end 69 is connected to the other end of the cylindrical portion 67 and has a generally hemispherical or conical shape about the axis CL. The tanks 61 have the same shape and the same dimensions. The tanks 61 are arranged parallel to each other with their axes CL extending in the lateral direction Y. The tanks 61 are arranged with their axes CL located in the same plane. The length of each tank 61 in the lateral direction Y is shorter than the length of the body 30 in the lateral direction Y. The number of tanks 61 provided in the tank unit 60 is not limited to 12, and may be 2 to 11 or may be 13 or more. The tanks 61 may be arranged with their axes CL extending in the longitudinal direction X.

Each tank 61 is composed of a liner made of a resin material having gas barrier properties against hydrogen gas, a reinforcing layer bonded to the outer surface of the liner, and a protective layer bonded to the outer surface of the reinforcing layer. The liner is made of a resin material such as polyethylene, nylon, or polypropylene. The liner may be made of the resin material with a hydrogen storage alloy or may be made of a metal material such as an aluminum alloy or stainless steel instead of the resin material. The reinforcing layer is made of, e.g., a carbon fiber reinforced resin, and the protective layer is made of, e.g., a glass fiber reinforced resin. Each of the reinforcing layer and the protective layer can be formed by filament winding.

The first ends 68 of the tanks 61 are connected by the first connecting portion 62. The second ends 69 of the tanks 61 are connected by the second connecting portion 63. The first connecting portion 62 and the second connecting portion 63 are fixed to the tank case 70 by bolts etc. A communication flow path 64 that allows communication between the tanks 61 is provided in the first connecting portion 62. The communication flow path 64 is connected to the hydrogen supply pipe via the main stop valve 65 provided at one end of the first connecting portion 62. When the main stop valve 65 is opened, hydrogen gas stored in each tank 61 is supplied to the hydrogen supply pipe. When the main stop valve 65 is closed, the supply of hydrogen gas to the hydrogen supply pipe is stopped.

According to the transport vehicle 10 of the present embodiment described above, since the tank units 60 are arranged between the bottom surface of the body 30 and the upper surface of the chassis frame 40, the hydrogen gas capacity can be increased without reducing the floor area of the cargo space 31. The transport vehicle 10 therefore has an increased driving range, and the cargo space 31 also has a large floor area. It is possible to reduce the length of the body 30 in the longitudinal direction X to provide a space for the tank units 60 between the cab 20 and the body 30. In this case, however, upward stacking of the tank units 60 in this space is limited by the cooling device 80 especially in the transport vehicle 10 having the cooling device 80 protruding above the cab 20 from the front surface of the body 30 like the present embodiment. In the present embodiment, since a space for the tank units 60 is provided not between the cab 20 and the body 30 but between the bottom surface of the body 30 and the upper surface of the chassis frame 40, the tank units 60 can be mounted without being limited by the cooling device 80. The hydrogen gas capacity is thus effectively increased as compared to the foiii in which a space for the tank units 60 is provided between the cab 20 and the body 30. In the present embodiment, since the tank units 60 are arranged between the bottom surface of the body 30 and the upper surface of the chassis frame 40, a change in position of the center of gravity of the transport vehicle 10 due to consumption of hydrogen gas is reduced as compared to the form in which the tank units 60 are stacked on top of each other between the cab 20 and the body 30.

In the present embodiment, since the cylindrical portions 67 of the tanks 61 of the tank unit 60 have the same outer diameter, manufacturing cost of the tank unit 60 is reduced as compared to the form in which the cylindrical portions 67 of the tanks 61 have different outer diameters. Especially in the present embodiment, since the tanks 61 of the tank unit 60 have the same shape and the same dimensions, the manufacturing cost of the tank unit 60 is further reduced.

In the present embodiment, since the cylindrical portions 67 of the tanks 61 of the tank unit 60 are arranged parallel to each other, the tanks 61 can be arranged more densely as compared to the form in which the cylindrical portions 67 of the tanks 61 are arranged with random orientations. Accordingly, the fuel gas capacity is more effectively increased.

In the present embodiment, hydrogen gas stored in the tanks 61 housed in the tank case 70 with the heat insulation material is consumed by power generation of the fuel cell 50. Accordingly, the internal pressure of each tank 61 decreases, and the surface temperature of each tank 61 decreases, drawing heat away from the sun ounding environment. The temperature in the tank case 70 is thus kept lower than the outside air temperature. Since the upper surface of the tank case 70 is in contact with the bottom surface of the body 30, this configuration reduces heat transfer from the bottom surface of the body 30 that forms the floor of the cargo space 31 to the inside of the cargo space 31. Power consumption of the cooling device 80 is thus reduced.

B. Second Embodiment

Figure 3:
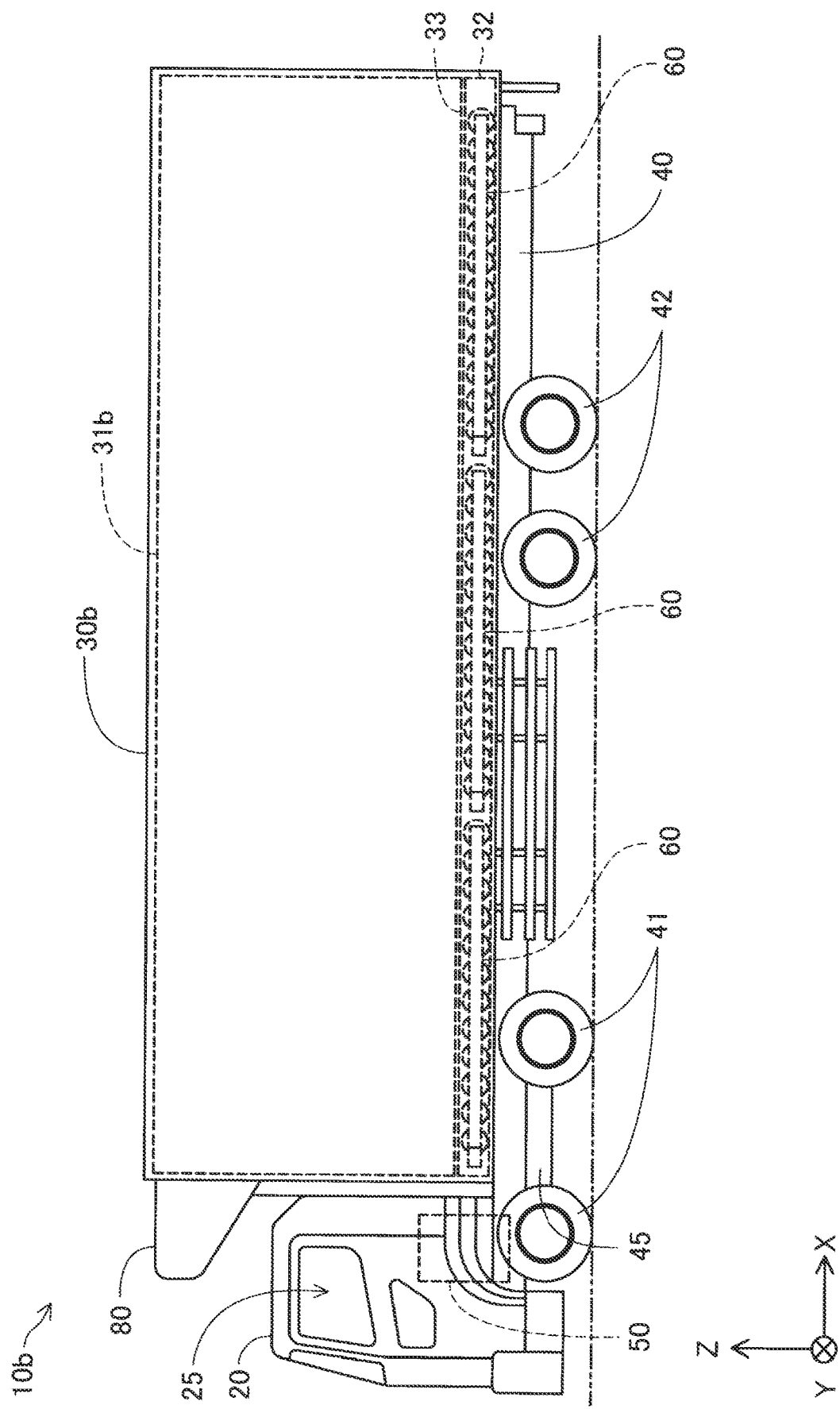
FIG. 3 is a side view illustrating a schematic configuration of a transport vehicle of a second embodiment.

FIG. 3 is a side view illustrating a schematic configuration of a transport vehicle 10b of a second embodiment. The second embodiment is different from the first embodiment in that the tank units 60 are arranged inside a body 30b. Other configurations of the second embodiment are the same as those of the first embodiment unless otherwise specified.

In the present embodiment, the body 30b has a cargo space 31b and a tank storage space 32 provided below the cargo space 31b. The tank units 60 are arranged inside the tank storage space 32. The cargo space 31b and the tank storage space 32 are separated by a floor panel 33 with a heat insulation material. In the present embodiment, the tank case 70 shown in FIG. 1 is not provided between the bottom surface of the body 30b and the upper surface of the chassis frame 40.

According to the transport vehicle 10b of the present embodiment described above, the inside of the body 30b is divided into upper and lower parts by the floor panel 33. This allows the cargo space 31b for freight and the tank storage space 32 for the tank units 60 to be provided inside the body 30b. The arrangement of the tank units 60 is thus easily optimized according to the form of the body 30b.

C. Third Embodiment

Figure 4:
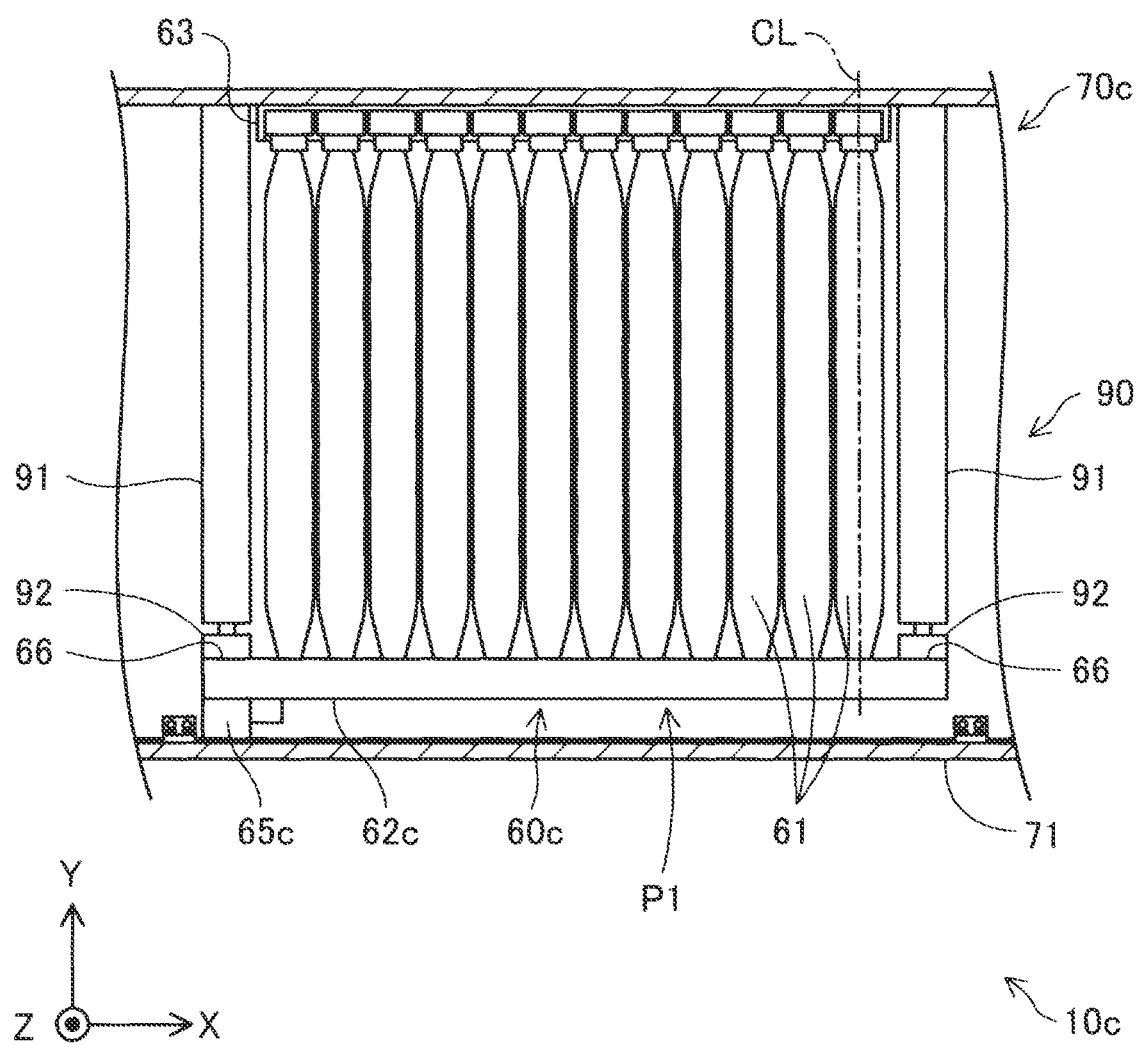
FIG. 4 is a first top view illustrating a schematic configuration of a slide mechanism of a third embodiment.
Figure 5:
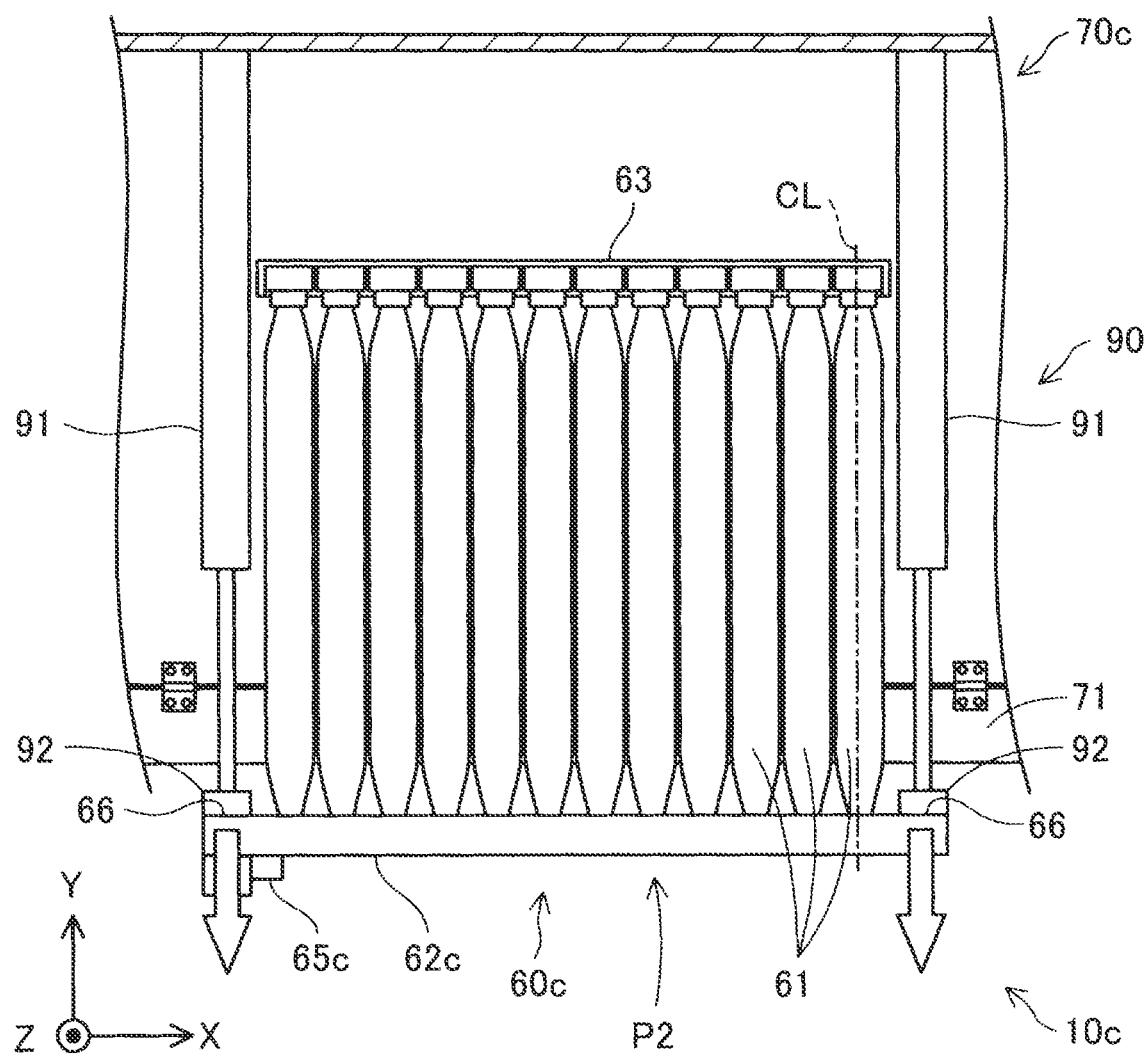
FIG. 5 is a second top view illustrating a schematic configuration of the slide mechanism of the third embodiment.

FIG. 4 is a first top view illustrating a schematic configuration of a slide mechanism 90 included in a transport vehicle 10c of a third embodiment. FIG. 5 is a second top view illustrating a schematic configuration of the slide mechanism 90 included in the transport vehicle 10c of the third embodiment. The third embodiment is different from the first embodiment in that the transport vehicle 10c includes the slide mechanism 90 for moving a tank unit 60c. Other configurations of the third embodiment are the same as those of the first embodiment unless otherwise specified.

FIG. 4 illustrates the tank unit 60c located at a first position P1, and FIG. 5 illustrates the tank unit 60c located at a second position P2. The first position P1 is a position where the tank unit 60c is located when hydrogen gas is supplied from the tank unit 60c to the fuel cell 50, and the second position P2 is a position where the tank unit 60c is located when the tank unit 60c is attached to the transport vehicle 10c or when the tank unit 60c is removed from the transport vehicle 10c. In the present embodiment, the second position P2 is the same as the first position P1 in the longitudinal direction X and the vertical direction Z but is different from the first position P1 in the lateral direction Y. At the first position P1, the tank unit 60c is located inside the tank case 70c. At the second position P2, a part of the tank unit 60c protrudes from the tank case 70c.

The slide mechanism 90 moves the tank unit 60c between the first position P1 and the second position P2. In the present embodiment, the slide mechanism 90 is composed of two air cylinders 91 disposed on the front and rear sides of the tank unit 60c. Each air cylinder 91 expands and contracts in the lateral direction Y. A fixing portion 92 is provided on the tip end of each air cylinder 91. The tank unit 60c is fixed to the fixing portions 92 by bolts, bands, etc. An electronic control unit (ECU) mounted on the transport vehicle 10c controls the air cylinders 91. The slide mechanism 90 may be composed of hydraulic cylinders instead of the air cylinders 91, or may be composed of a combination of a gear, a belt, a motor, etc.

In the present embodiment, fixed portions 66 are provided on both ends of a first connecting portion 62c of the tank unit 60c. The fixed portions 66 are fixed to the fixing portions 92 of the air cylinders 91. The tank unit 60c is thus not fixed to the tank case 70c but is fixed to the fixing portions 92 of the air cylinders 91. A main stop valve 65c is mounted on a portion different from the fixed portions 66. The configurations of each tank 61 and the second connecting portion 63 are the same as those of the first embodiment. An open and close portion 71 is provided in a side wall of the tank case 70c.

When attaching the tank unit 60c to the transport vehicle 10c, the tank unit 60c is placed at the second position P2, and the fixed portions 66 of the tank unit 60c are fixed to the fixing portions 92 of the slide mechanism 90. The slide mechanism 90 is then driven to move the tank unit 60c from the second position P2 to the first position P1. After the tank unit 60c is moved to the first position P1, a hydrogen supply pipe is attached to the main stop valve 65c, so that hydrogen gas can be supplied from the tank unit 60c to the fuel cell 50. The open and close portion 71 of the tank case 70c is closed after the hydrogen supply pipe is connected to the main stop valve 65c. When removing the tank unit 60c from the transport vehicle 10c, the open and close portion 71 of the tank case 70c is opened, and the hydrogen supply pipe is detached from the main stop valve 65c. The slide mechanism 90 is then driven to move the tank unit 60c from the first position P1 to the second position P2. After the tank unit 60c is moved to the second position P2, the fixed portions 66 are detached from the fixing portions 92, so that the tank unit 60c can be removed from the transport vehicle 10c.

According to the transport vehicle 10c of the present embodiment described above, the slide mechanism 90 is driven to move the tank unit 60c between the first position P1 and the second position P2. For example, this configuration facilitates the replacement work of the tank unit 60c using a forklift etc. Especially in the transport vehicle 10c that transports frozen freight like the present embodiment, when the tank unit 60c is refilled with hydrogen gas, the temperature of each tank 61 increases due to an increase in internal pressure of each tank 61, and the temperature in the cargo space 31 may therefore increase. In the present embodiment, the tank unit 60c attached to the transport vehicle 10c can be easily replaced with another tank unit 60c filled with hydrogen gas by using the slide mechanism 90. It is therefore not necessary to refill the tank unit 60c attached to the transport vehicle 10c. Accordingly, the tank unit 60c can be quickly replaced while reducing an increase in temperature of the cargo space 31, and transportation of freight can thus be quickly resumed. The present embodiment may be combined with the second embodiment. For example, the slide mechanism 90 may be provided in the body 30b of the transport vehicle 10b of the second embodiment shown in FIG. 3. In this case, the open and close portion 71 may be provided in a side wall of the tank storage space 32 of the body 30b.

D. Fourth Embodiment

FIG. 6 is a perspective view illustrating the configuration of a tank unit 60d included in a transport vehicle 10d according to a fourth embodiment. In FIG. 6, only the tank unit 60d is shown, and the body 30, the chassis frame 40, etc. are not shown. The fourth embodiment is different from the first embodiment in the form of the tank unit 60d. Other configurations are the same as those of the first embodiment unless otherwise specified.

In the present embodiment, a single tank unit 60d is mounted on the transport vehicle 10d. Tanks 61d of the tank unit 60d are arranged parallel to each other with their axes CL extending in the longitudinal direction X. A cylindrical portion 67d of each tank 61d is longer than the cylindrical portion 67 of the tank 61 of the first embodiment shown in FIG. 2. The configurations of the first end 68 and the second end 69 are the same as those of the first embodiment. The length of each tank 61d in the longitudinal direction X is greater than the length of the body 30 in the lateral direction Y and is about the same as the length of the body 30 in the longitudinal direction X.

According to the transport vehicle 10d of the present embodiment described above, the hydrogen gas capacity is increased by the tank unit 60d without reducing the floor area of the cargo space 31.

E. Other Embodiments (E1) The transport vehicles 10 to 10d of the above embodiments are configured as a truck. However, the transport vehicles 10 to 10d may be configured as a tractor that tows a trailer. In this case, the fuel cell 50 may be mounted on the trailer or may be mounted on the tractor. The tank units 60, 60c, 60d may be mounted on the trailer or may be mounted on the tractor.

(E2) In the transport vehicles 10 to 10d of the above embodiments, the tanks 61, 61c, 61d of the tank units 60, 60c, 60d have the same outer diameter. However, the tanks 61, 61c, 61d may have different outer diameters.

(E3) In the transport vehicles 10 to 10d of the above embodiments, the tanks 61, 61c, 61d of the tank units 60, 60c, 60d are arranged with the axes CL of the tanks 61, 61c, 61d parallel to each other. However, the tanks 61, 61c, 61d may not be arranged with their axes CL parallel to each other.

(E4) The transport vehicles 10 to 10d of the above embodiments include the cooling device 80. However, the transport vehicles 10 to 10d may not include the cooling device 80. In this case, the bodies 30, 30b may be configured as a van body other than a refrigerated container, may be configured as a flat body with no ceiling, or may be configured as a wing body, namely a van body whose side walls open and close. A crane may be attached to the bodies 30, 30b.

(E5) In the transport vehicle 10c of the third embodiment, the second position P2 is the same as the first position P1 in the longitudinal direction X and the vertical direction Z and is different from the first position P1 in the lateral direction Y. However, the second position P2 may be the same as the first position P1 in the lateral direction Y and the vertical direction Z and different from the first position P1 in the longitudinal direction X. In this case, the slide mechanism 90 may be composed of air cylinders etc. that expand and contract in the X direction.

The present disclosure is not limited to the above embodiments and can be implemented with various configurations without departing from the spirit and scope of the disclosure. For example, the technical features of the embodiments corresponding to the technical features of each form described in the section "SUMMARY" may be replaced or combined as appropriate. Any of these technical features may be omitted as appropriate unless described as essential in the present specification.

What is claimed is:

1. A transport vehicle configured to run on electricity generated by a fuel cell, comprising:
    a body having a cargo space for freight;
    a chassis frame located below the body and supporting the body; and
    a tank unit including a plurality of tanks that stores fuel gas to be used for power generation by the fuel cell and a connecting portion connecting the tanks, the tank unit being located between the cargo space and the chassis frame.

2. The transport vehicle according to claim 1, wherein the tank unit is located between a bottom surface of the body and an upper surface of the chassis frame.

3. The transport vehicle according to claim 1, wherein:
    the body has a tank storage space below the cargo space; and
    the tank unit is located in the tank storage space.

4. The transport vehicle according to claim 1, wherein:
    each of the tanks has a cylindrical portion; and
    the cylindrical portion of each of the tanks has a same outer diameter.

5. The transport vehicle according to claim 1, wherein:
    each of the tanks has a cylindrical portion; and
    the cylindrical portion of each of the tanks is arranged parallel to each other.

6. The transport vehicle according to claim 1, further comprising a cooling device configured to cool the cargo space.

7. The transport vehicle according to claim 1, further comprising a slide mechanism configured to move the tank unit between a first position and a second position, wherein:
    the first position is a position where the tank unit is located when the fuel gas is supplied from the tank unit to the fuel cell; and
    the second position is a position where the tank unit is located when loading the tank unit onto the transport vehicle or when unloading the tank unit from the transport vehicle.

* * * * *